United States Patent
Neill et al.

(10) Patent No.: US 10,935,788 B2
(45) Date of Patent: Mar. 2, 2021

(54) HYBRID VIRTUAL 3D RENDERING APPROACH TO STEREOVISION

(71) Applicant: Nvidia Corporation, Santa Clara, CA (US)

(72) Inventors: Patrick Neill, Santa Clara, CA (US); Rochelle Pereira, Santa Clara, CA (US); Vukasin Milovanovic, Santa Clara, CA (US); David Cook, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 101 days.

(21) Appl. No.: 14/604,563

(22) Filed: Jan. 23, 2015

(65) Prior Publication Data

US 2015/0213640 A1 Jul. 30, 2015

Related U.S. Application Data

(60) Provisional application No. 61/931,489, filed on Jan. 24, 2014.

(51) Int. Cl.
*H04N 13/261* (2018.01)
*G02B 27/01* (2006.01)
(Continued)

(52) U.S. Cl.
CPC ......... *G02B 27/017* (2013.01); *H04N 13/156* (2018.05); *H04N 13/261* (2018.05); *H04N 13/279* (2018.05); *G02B 2027/0134* (2013.01)

(58) Field of Classification Search
CPC .................................................. G06T 19/006
See application file for complete search history.

(56) References Cited

U.S. PATENT DOCUMENTS

| 4,864,629 A | 9/1989 | Deering |
| 5,430,464 A | 7/1995 | Lumelsky |

(Continued)

FOREIGN PATENT DOCUMENTS

| CN | 101420618 | 4/2009 |
| CN | 101945287 | 1/2011 |

(Continued)

OTHER PUBLICATIONS

Wan, Ming, et al. "Interactive stereoscopic rendering of volumetric environments." Visualization and Computer Graphics, IEEE Transactions on Oct. 1, 2004: 15-28.*

(Continued)

*Primary Examiner* — Phong X Nguyen
(74) *Attorney, Agent, or Firm* — Shook, Hardy & Bacon L.L.P.

(57) ABSTRACT

A method for stereoscopically presenting visual content is disclosed. The method comprises identifying and distinguishing between a first type of content and a second type of content of a frame to be stereoscopically displayed. The method also comprises rendering the first type of content in a first left and a first right frame from a single perspective using a first stereoscopic rendering method. Further, the method comprises rendering the second type of content in a second left and a second right frame using a second, different stereoscopic method from two different perspectives. Additionally, the method comprises merging the first and second left frames and the first and second right frames to produce a resultant left frame and a resultant right frame. Finally, the method comprises displaying the resultant left frame and the resultant right frame for stereoscopic perception by a viewer.

20 Claims, 10 Drawing Sheets

(51) Int. Cl.
*H04N 13/279* (2018.01)
*H04N 13/156* (2018.01)

(56) References Cited

U.S. PATENT DOCUMENTS

| | | |
|---|---|---|
| 5,483,254 A | 1/1996 | Powell |
| 5,500,939 A | 3/1996 | Kurihara |
| 5,577,981 A | 11/1996 | Jarvik |
| 5,841,447 A | 11/1998 | Drews |
| 5,886,701 A | 3/1999 | Chauvin et al. |
| 5,913,727 A | 6/1999 | Ahdoot |
| 5,949,428 A | 9/1999 | Toelle et al. |
| 6,016,474 A | 1/2000 | Kim et al. |
| 6,057,855 A | 5/2000 | Barkans |
| 6,064,354 A | 5/2000 | DeLuca |
| 6,141,740 A | 10/2000 | Mahalingaiah et al. |
| 6,243,054 B1 | 6/2001 | DeLuca |
| 6,278,418 B1 | 8/2001 | Doi |
| 6,281,903 B1 | 8/2001 | Martin et al. |
| 6,308,565 B1 | 10/2001 | French et al. |
| 6,314,493 B1 | 11/2001 | Luick |
| 6,438,664 B1 | 8/2002 | McGrath et al. |
| 6,476,807 B1 | 11/2002 | Duluk, Jr. et al. |
| 6,492,991 B1 | 12/2002 | Morein et al. |
| 6,496,193 B1 | 12/2002 | Surti et al. |
| 6,525,725 B1 | 2/2003 | Deering |
| 6,545,683 B1 | 4/2003 | Williams |
| 6,559,813 B1 | 5/2003 | DeLuca et al. |
| 6,611,253 B1 | 8/2003 | Cohen |
| 6,690,381 B1 | 2/2004 | Hussain et al. |
| 6,750,870 B2 | 6/2004 | Olarig |
| 6,825,847 B1 | 11/2004 | Molnar et al. |
| 6,839,062 B2 | 1/2005 | Aronson et al. |
| 6,891,543 B2 | 5/2005 | Wyatt |
| 6,951,515 B2 | 10/2005 | Ohshima et al. |
| 7,015,909 B1 | 3/2006 | Morgan, III et al. |
| 7,072,477 B1 | 7/2006 | Kincaid |
| 7,170,515 B1 | 1/2007 | Zhu |
| 7,203,356 B2 | 4/2007 | Gokturk et al. |
| 7,218,291 B2 | 5/2007 | Abdalla et al. |
| 7,308,115 B2 | 12/2007 | Zhang et al. |
| 7,324,594 B2 | 1/2008 | Lamboray et al. |
| 7,370,016 B1 | 5/2008 | Hunter et al. |
| 7,463,270 B2 | 12/2008 | Vale et al. |
| 7,486,290 B1 | 2/2009 | Kilgariff et al. |
| 7,616,202 B1 | 11/2009 | Chen et al. |
| 7,692,659 B1 | 4/2010 | Molnar et al. |
| 7,719,563 B2 | 5/2010 | Richards |
| 7,839,803 B1 | 11/2010 | Snelgrove et al. |
| 7,856,147 B2 | 12/2010 | Srinidhi |
| 7,925,067 B2 | 4/2011 | Bacus et al. |
| 8,019,449 B2 | 9/2011 | Barzegar et al. |
| 8,024,768 B2 | 9/2011 | Berger et al. |
| 8,279,168 B2 | 10/2012 | Glomski et al. |
| 8,363,969 B1 | 1/2013 | Wang et al. |
| 8,375,301 B2 | 2/2013 | Nuyttens et al. |
| 8,411,966 B2 | 4/2013 | Zhang et al. |
| 8,610,707 B2 | 12/2013 | Chen |
| 2001/0043751 A1 | 11/2001 | Takahashi et al. |
| 2002/0024675 A1 | 2/2002 | Foxlin |
| 2002/0109701 A1 | 8/2002 | Deering |
| 2003/0001857 A1 | 1/2003 | Doyle |
| 2003/0032484 A1 | 2/2003 | Ohshima et al. |
| 2003/0122820 A1 | 7/2003 | Doyle |
| 2003/0160798 A1 | 8/2003 | Buehler |
| 2003/0184468 A1 | 10/2003 | Chen et al. |
| 2004/0021664 A1 | 2/2004 | Takemoto et al. |
| 2004/0041822 A1 | 3/2004 | Iizuka et al. |
| 2004/0102247 A1 | 5/2004 | Smoot et al. |
| 2004/0130552 A1 | 7/2004 | Duluk, Jr. et al. |
| 2004/0205281 A1 | 10/2004 | Lin et al. |
| 2005/0009583 A1 | 1/2005 | Cheung et al. |
| 2005/0062738 A1 | 3/2005 | Handley et al. |
| 2005/0093873 A1 | 5/2005 | Paltashev et al. |
| 2005/0140682 A1 | 6/2005 | Sumanaweera et al. |
| 2006/0086022 A1* | 4/2006 | Would ............... G06F 3/0482 40/584 |
| 2006/0170703 A1 | 8/2006 | Liao |
| 2006/0284792 A1 | 12/2006 | Foxlin |
| 2007/0018973 A1 | 1/2007 | Shih et al. |
| 2007/0188444 A1 | 8/2007 | Vale et al. |
| 2007/0239409 A1 | 10/2007 | Alan |
| 2007/0257906 A1 | 11/2007 | Shimura et al. |
| 2008/0007559 A1* | 1/2008 | Kalaiah ............... H04N 13/275 345/501 |
| 2008/0049964 A1 | 2/2008 | Porwal et al. |
| 2008/0143895 A1 | 6/2008 | Peterka et al. |
| 2008/0252596 A1 | 10/2008 | Bell et al. |
| 2008/0273755 A1 | 11/2008 | Hildreth |
| 2008/0293464 A1 | 11/2008 | Cheng et al. |
| 2008/0293488 A1 | 11/2008 | Cheng et al. |
| 2008/0312010 A1 | 12/2008 | Marty et al. |
| 2009/0077504 A1 | 3/2009 | Bell et al. |
| 2009/0099824 A1 | 4/2009 | Falash et al. |
| 2010/0073363 A1 | 3/2010 | Densham et al. |
| 2010/0074489 A1 | 3/2010 | Bacus et al. |
| 2010/0091012 A1* | 4/2010 | Newton ............... H04N 13/398 345/419 |
| 2010/0149372 A1 | 6/2010 | Silverstein |
| 2010/0177931 A1 | 7/2010 | Whytock et al. |
| 2010/0194863 A1 | 8/2010 | Lopes et al. |
| 2010/0220175 A1* | 9/2010 | Claydon ............... H04N 13/183 348/43 |
| 2010/0226628 A1* | 9/2010 | Yamaji ............... H04N 13/04 386/353 |
| 2010/0245356 A1* | 9/2010 | Gateau ............... H04N 13/279 345/427 |
| 2010/0296747 A1 | 11/2010 | Srinidhi |
| 2011/0128351 A1* | 6/2011 | Newton ............... H04N 5/278 348/43 |
| 2011/0159885 A1 | 6/2011 | Song et al. |
| 2011/0165841 A1 | 7/2011 | Baek et al. |
| 2011/0181622 A1 | 7/2011 | Bacus et al. |
| 2011/0205389 A1 | 8/2011 | Zhang et al. |
| 2011/0249076 A1 | 10/2011 | Zhou et al. |
| 2011/0255775 A1* | 10/2011 | McNamer ............... G06T 7/596 382/154 |
| 2012/0014456 A1 | 1/2012 | Martinez Bauza et al. |
| 2012/0113115 A1* | 5/2012 | Cuttner ............... H04N 13/156 345/419 |
| 2012/0139906 A1 | 6/2012 | Zhang et al. |
| 2012/0162379 A1 | 6/2012 | Dahi et al. |
| 2012/0169711 A1* | 7/2012 | Penttila ............... H04N 13/359 345/419 |
| 2012/0169729 A1* | 7/2012 | Yamaji ............... H04N 13/156 345/419 |
| 2012/0182402 A1* | 7/2012 | Hwangbo ............ G06K 9/3266 348/51 |
| 2012/0183215 A1 | 7/2012 | Van Hook et al. |
| 2012/0223947 A1* | 9/2012 | Nystad ............... G06T 15/80 345/426 |
| 2012/0224035 A1* | 9/2012 | Noguchi ............... H04N 13/261 348/54 |
| 2012/0242662 A1* | 9/2012 | Ninan ............... H04N 13/341 345/419 |
| 2012/0257065 A1 | 10/2012 | Velarde et al. |
| 2012/0262592 A1 | 10/2012 | Rabii |
| 2012/0320232 A1 | 12/2012 | Trumbo |
| 2013/0009943 A1 | 1/2013 | Li et al. |
| 2013/0027521 A1 | 1/2013 | DeLuca |
| 2013/0027606 A1 | 1/2013 | Voss et al. |
| 2013/0069932 A1* | 3/2013 | Ha ............... H04N 13/261 345/419 |
| 2013/0201283 A1* | 8/2013 | Broberg ............... H04N 13/156 348/43 |
| 2013/0202191 A1 | 8/2013 | Wang |
| 2014/0132603 A1* | 5/2014 | Raghoebardayal ..... G06T 17/20 345/420 |
| 2014/0293028 A1* | 10/2014 | Nguyen ............... H04N 13/305 348/59 |

(56) References Cited

U.S. PATENT DOCUMENTS

| 2015/0049169 A1* | 2/2015 | Krig | H04N 13/211 |
| | | | 348/46 |
| 2015/0071525 A1* | 3/2015 | Routhier | G06T 7/593 |
| | | | 382/154 |
| 2015/0103072 A1* | 4/2015 | Son | G06T 15/40 |
| | | | 345/419 |

FOREIGN PATENT DOCUMENTS

| CN | 102006473 | 4/2011 |
| CN | 102055982 | 5/2011 |

OTHER PUBLICATIONS

Duca, et al., A Relational Debugging Engine for Graphics Pipeline, International Conference on Computer Graphics and Ineractive Techniques, ACM SIGGRAPH 2005, pp. 453-463, ISSN: 0730-0301.

GDebugger, graphic Remedy, http://vvww.gremedy.com, Aug. 8, 2006.

Parhami, Computer Arithmetic, Oxford University Press, Jun. 2000, pp. 413-418.

* cited by examiner

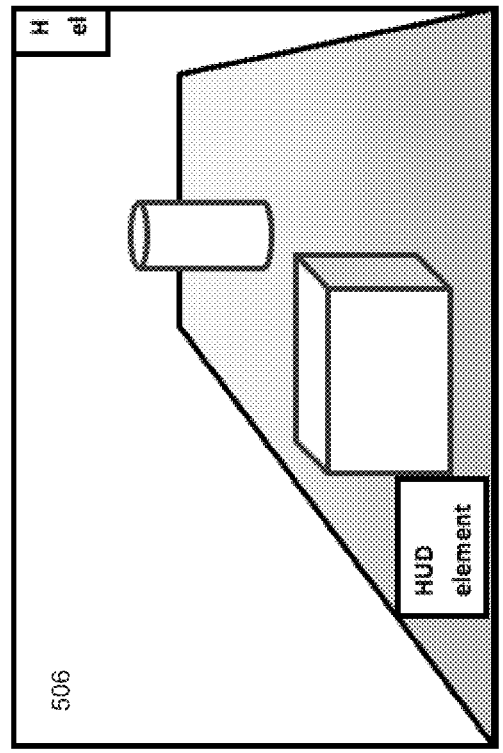
Figure 5B
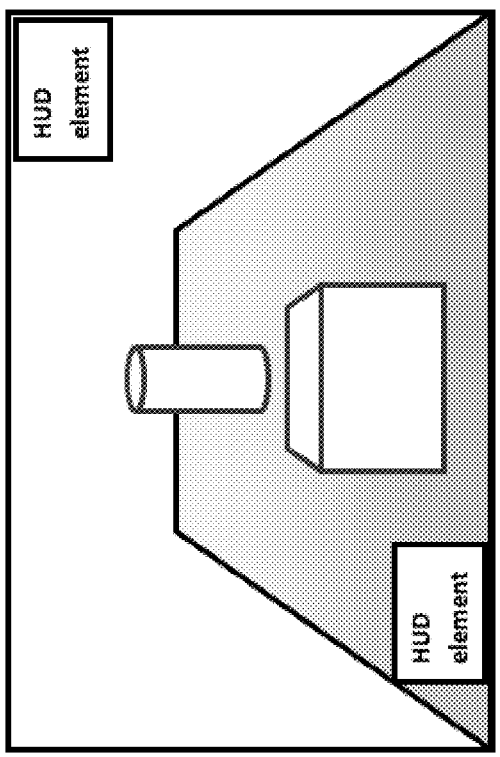
Figure 5A
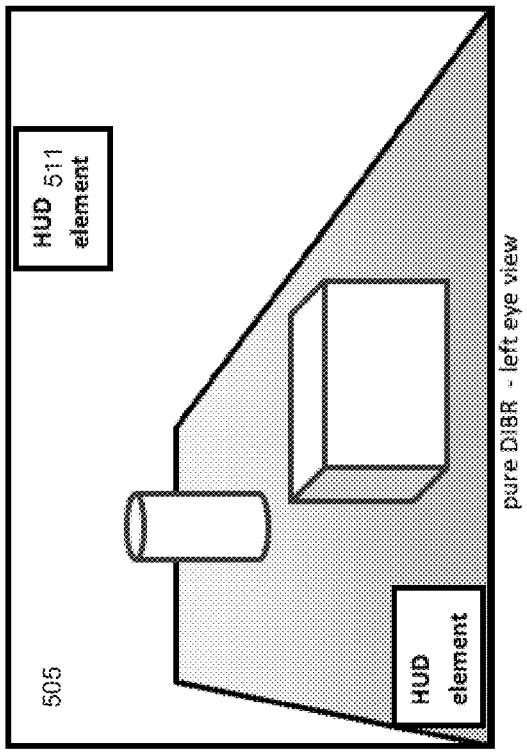

ns underneath it (because of transparency issues), thereby, obstructing and disrupting a user's perception of the HUD element.

HYBRID VIRTUAL 3D RENDERING APPROACH TO STEREOVISION

CROSS-REFERENCE TO RELATED APPLICATIONS

This application is a conversion of and claims priority to and the benefit of Provisional Patent Application No. 61/931,489, entitled "HYBRID VIRTUAL 3D RENDERING APPROACH TO STEREOVISION," having a filing date of Jan. 24, 2014, which is herein incorporated by reference in its entirety.

FIELD OF THE INVENTION

Embodiments according to the present invention generally relate to image rendering and more specifically to stereoscopically rendering visual content.

BACKGROUND OF THE INVENTION

Various methods exist for stereoscopically presenting visual content (so that users perceive a 3D visual effect). Each of these methods has associated tradeoffs. For example, one method might produce very high-quality visual effects with minimal artifacts, but at a high cost in terms of complexity and consumption of processing resources, e.g., full stereoscopic 3D vision implemented with draw calls to the right and left eyes. Another method might enable fast and efficient real-time processing, but cause eyestrain or produce undesirable artifacts when rendering specific types of content, e.g., addressing transparency issues with techniques like depth-image based rendering (DIBR). Still other methods might require use of complex, bulky photographic equipment in order to record separate visual channels (e.g., providing left and right eye perspectives).

Depth-image based rendering (DIBR) can be particularly advantageous in settings where high-speed rendering is desirable, for example in certain types of computer gaming applications. In typical DIBR methods, workflow employs a data structure in which pixel color data is augmented with depth information for each pixel. Depth can be specified in terms of various frames of reference—e.g., distance from a user's vantage point, distance from a light source, etc. DIBR excels in many respects and under various metrics, although DIBR methods break down when rendering certain types of content.

In particular, DIBR methods struggle in the face of occlusion, transparency, and depth-blended content. For example, effects like transparency are difficult to solve with DIBR since there typically is no depth information for blended pixels at the stage in the rendering pipeline at which DIBR is applied. This is particularly noticeable in HUD (heads-up display) elements, which are usually blended on top of the scene as a post-process. In video gaming, HUD elements is the method by which information is visually relayed to the player as part of a game's user interface. The HUD is frequently used to simultaneously display several pieces of information including the main character's health, items, and an indication of game progression. Because effects like occlusion and transparency are difficult to solve with DIBR, a HUD element in a typical video game utilizing DIBR may appear either shifted or skewed off-screen (because of occlusion issues) or overlaid on video game ele-

BRIEF SUMMARY OF THE INVENTION

Accordingly, a need exists to minimize the effects of occlusion and transparency when using image rendering techniques such as DIBR. In one embodiment, to address the distortive effects of occlusion and transparency when performing DIBR, full stereoscopic 3D vision rendering techniques are used to generate the HUD elements in the scene using two different viewing perspectives, while regular DIBR is used to generate all the remaining elements in the scene. 3D vision rendering techniques duplicate draw calls to both the left and the right eyes and, therefore, the distortive effects of occlusion and transparency are avoided when creating the HUD elements for on-screen display. The results of the 3D vision and DIBR rendering methods are then combined to generate the resultant stereoscopic images for display.

In one embodiment, a method for stereoscopically presenting visual content is disclosed. The method comprises identifying and distinguishing between a first type of content and a second type of content of a frame to be stereoscopically displayed. The method also comprises rendering the first type of content in a first left and a first right frame from a single perspective using a first stereoscopic rendering method. Further, the method comprises rendering the second type of content in a second left and a second right frame using a second, different stereoscopic method from two different perspectives. Additionally, the method comprises merging the first and second left frames and the first and second right frames to produce a resultant left frame and a resultant right frame. Finally, the method comprises displaying the resultant left frame and the resultant right frame for stereoscopic perception by a viewer.

In another embodiment, a method for generating a stereoscopic representation of a frame including content of a first type and content of a second type is presented. The method comprises using depth-image based rendering to stereoscopically represent the content of the first type. The method also comprises using 3D-vision rendering to stereoscopically represent the content of the second type. Further, the method comprises merging outputs of the depth-image based rendering and the 3D-vision rendering to produce a left and right frame, wherein the left and right frames are presented in a merged fashion so that both types of content are stereoscopically perceivable by a user.

In a different embodiment, a system for stereoscopically presenting visual content is disclosed. The system comprises a memory storing information related to the visual content and a GPU coupled to the memory, the processor operable to implement the method of stereoscopically presenting visual content. The method comprises identifying and distinguishing between a first type of content and a second type of content of a frame to be stereoscopically displayed. The method also comprises rendering the first type of content in a first left and a first right frame from a single perspective using a first stereoscopic rendering method. Further, the method comprises rendering the second type of content in a second left and a second right frame using a second, different stereoscopic method from two different perspectives. Additionally, the method comprises merging the first and second left frames and the first and second right frames to produce a resultant left frame and a resultant right frame.

Finally, the method comprises displaying the resultant left frame and the resultant right frame for stereoscopic perception by a viewer.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 5A and 5B provides an example illustrating the problem of occlusion when using the DIBR technique to generate stereoscopic frames.

Figure 1:
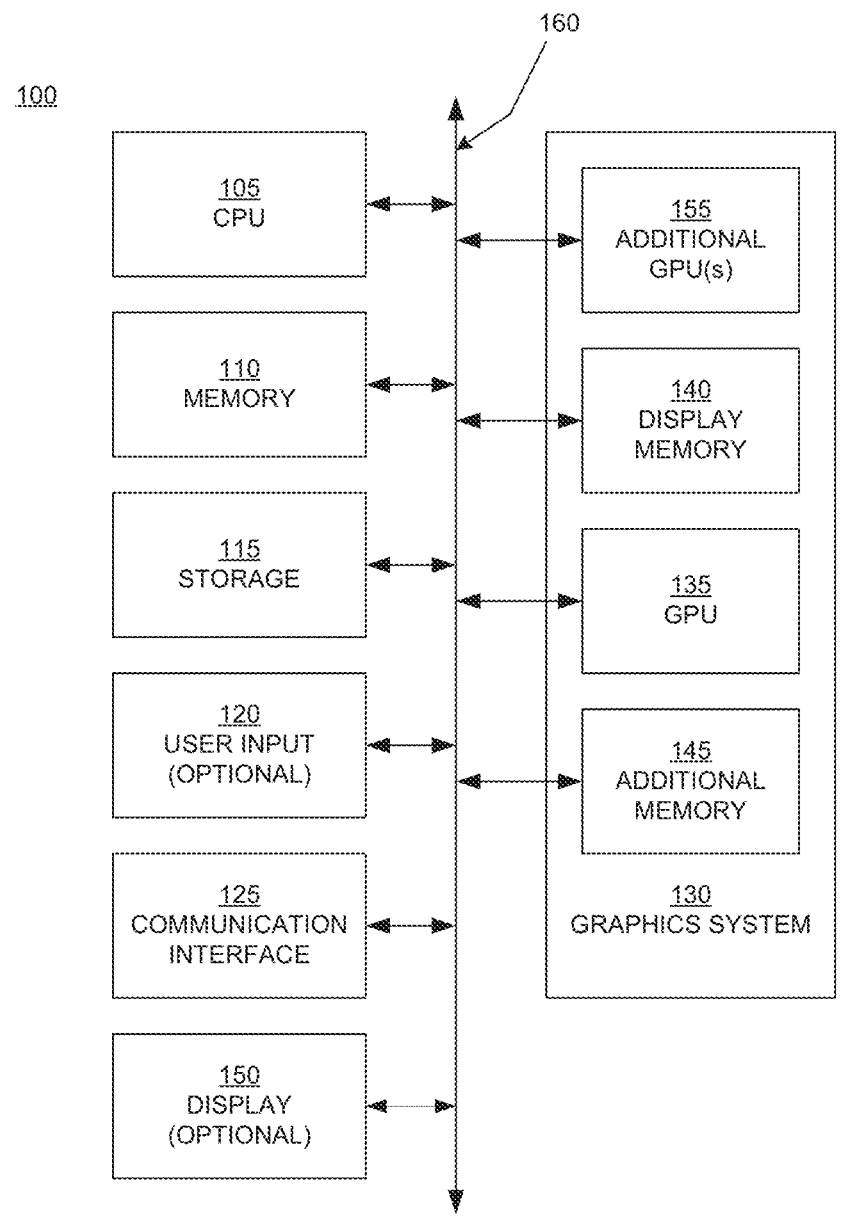
FIG. 1 is a block diagram of an example of a computing system capable of implementing embodiments according to the present invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 9) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "rendering," "merging," and "using" (e.g., flowcharts 950 and 1050) or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

FIG. 1 is a block diagram of an example of a computer system 100 capable of implementing embodiments according to the present invention. In one embodiment, the hybrid DIBR/3D-vision rendering framework of the present invention may be implemented on a GPU 135 of exemplary computer system 100.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including an Intranet or the Internet. In one embodiment, the computer system 100 receives instructions and user inputs from a remote computer through communication interface 125. Communication interface 125 can comprise a transmitter and receiver for communicating with remote devices.

The optional display device 150 may be any device capable of displaying visual information in response to a signal from the computer system 100.

The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications or processes executing in parallel. In one embodiment, the hybrid DIBR/3D-vision approach to stereovision in accordance with embodiments of the present invention can be implemented efficiently on GPU 135.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications or processes executing in parallel. Each additional GPU 155 can operate in conjunction with the GPU 135, for example, to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
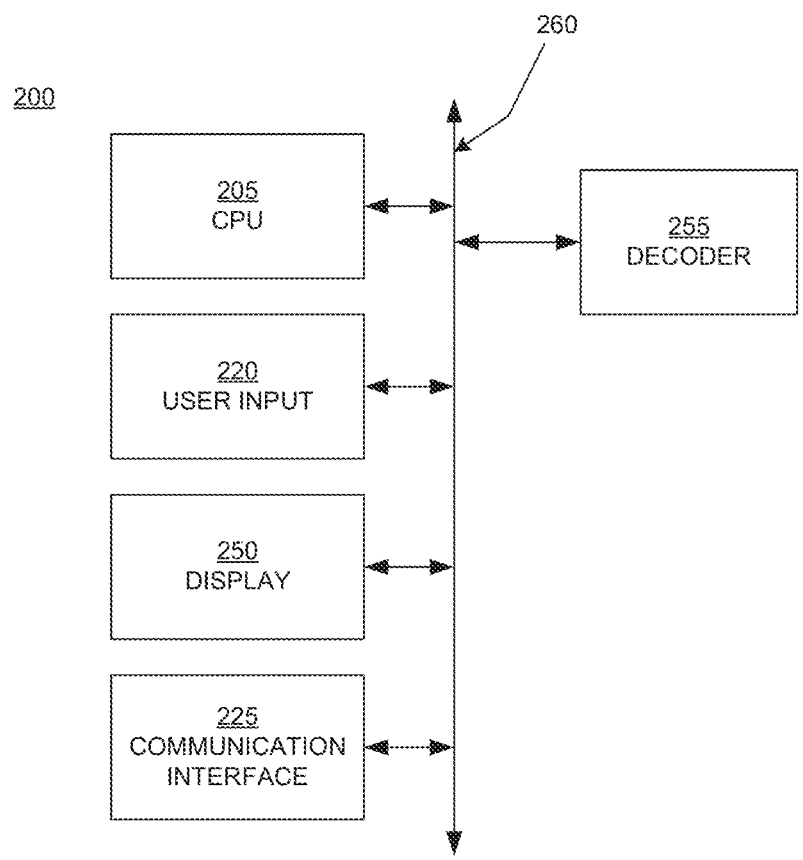
FIG. 2 is a block diagram of an example of an end user or client device capable of implementing embodiments according to the present invention.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones. The communication interface 225 allows the client device 200 to communicate with other computer systems (e.g., the computing system 100 of FIG. 1) via an electronic communications network, including wired and/or wireless communication and including the Internet.

The decoder 255 may be any device capable of decoding (decompressing) data that may be encoded (compressed). For example, the decoder 255 may be an H.264 decoder. The display device 250 may be any device capable of displaying visual information, including information received from the decoder 255. In particular, as will be described below, the display device 250 may be used to display visual information received from the computing system 100. The components of the client device 200 may be coupled via one or more data buses 260.

Relative to the computing system 100, the client device 200 in the example of FIG. 2 may have fewer components and less functionality and, as such, may be referred to as a thin client. However, the client device 200 may include other components including those described above. In one embodiment, stereoscopic images constructed using a hybrid DIBR/3D vision approach created on computing system 100 in accordance with the principles of the present invention may be transmitted to client device 200 over a network.

In general, the client device 200 may be any type of device that has display capability, the capability to decode (decompress) data, and the capability to receive inputs from a user and send such inputs to the computing system 100. However, the client device 200 may have additional capabilities beyond those just mentioned. The client device 200 may be, for example, a personal computer, a tablet computer, a mobile device, a gaming console, a television, or the like.

Hybrid Virtual 3D Rendering Approach to Stereovision

The present discussion sets forth novel systems and methods for stereoscopically rendering visual content, e.g., so as to produce perceivable 3D visual effects. Rapid processing and efficient use of computing resources typically are important considerations in designing stereoscopic rendering systems. Computer gaming applications, for example, often require computationally intensive graphics processing and demand presentation of high-quality 3D content at relatively high frame rates. In these and similar settings, depth-image based rendering (DIBR) methods can provide high-quality 3D effects while remaining relatively lightweight in terms of processing time and resource consumption. In contrast, higher quality 3D vision methods, which replicate left and right eye draw calls, improve quality at a relatively high cost (i.e., slow processing and computationally expensive).

In one class of examples, the present description contemplates a hybrid processing regime in which some content is stereoscopically rendered using one method, with other content being rendered stereoscopically with another method. The visual output is merged so that both types of content are presented stereoscopically at the "same time." Still more specifically, an image-based technique, e.g., DIBR (single perspective) may be used for some content (the majority), with other content rendered via 3D vision methods (dual perspectives). This is particularly advantageous when used in connection with depth-blended content, such as content involving heads-up display (HUD) elements or other transparency effects. More particularly, using a 3D vision method for the transparent/depth-blended elements can yield greater fidelity and avoid undesirable artifacts.

As explained above, DIBR is used as a faster and more efficient alternative to 3D vision. It utilizes an image based approach to generate other viewpoints from a single color image and a depth buffer. One example of DIBR is rendering the scene from a single center viewpoint, and then using the DIBR process to generate the left and the right perspectives. Another approach to DIBR is to render the scene from the left eye's perspective and then using DIBR to generate the right eye perspective. This is done as a post-process, resulting in faster performance and lower complexity when compared to the more accurate 3D vision implementation. Additionally, DIBR can improve compatibility in games 3D vision has difficulty with. For example, correct handling of shadows, skyboxes, and billboarded quads are handled implicitly by the post-processing nature of DIBR. Despite its advantages, DIBR also has some drawbacks, e.g., the problems of occlusion and transparency mentioned earlier.

Figure 3:
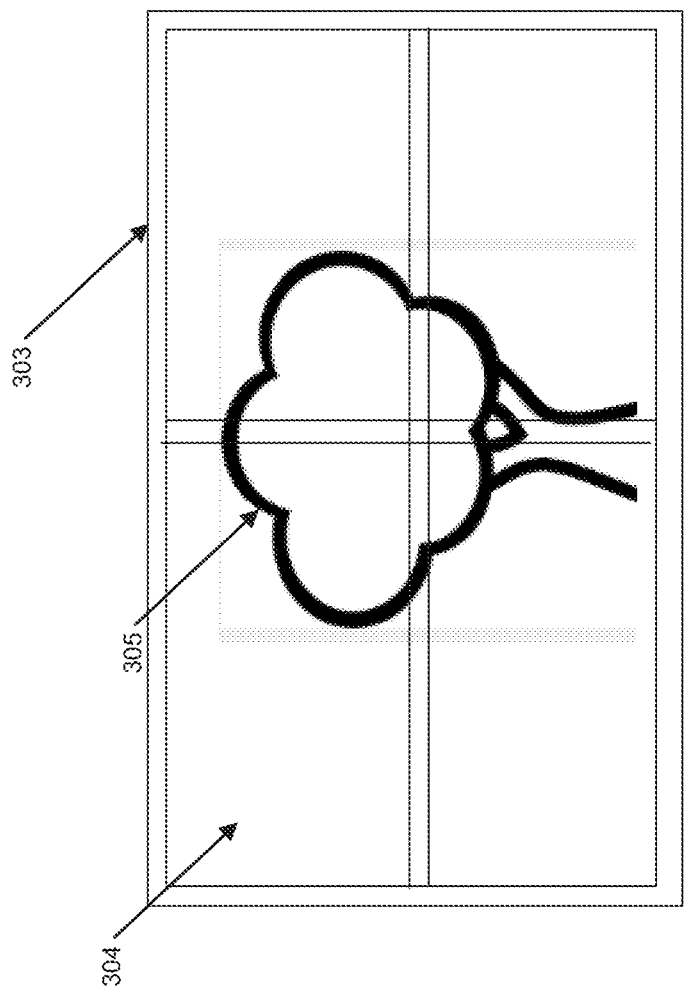
FIG. 3 provides an example illustrating the problem of transparency when using the DIBR technique to generate stereoscopic frames.

FIG. 3 provides an example illustrating the problem of transparency when using the DIBR technique to generate stereoscopic frames. As an illustrative example, FIG. 3 uses the viewing of a tree 305 through a window 303. The transparent element in this case—i.e., the window surface 304—produces a complication that cannot easily be handled by DIBR. DIBR contemplates a data structure in which each pixel has a color value and a single depth value. Accordingly, DIBR attempts to generate a stereoscopic image using simply a single cover image with a single corresponding depth value for each pixel in the image.

While the generated stereoscopic image with DIBR is not as high quality as one rendered by 3D-vision (which duplicates rendering for both the left and right eye), it is faster and more efficient. However, the complexity introduced by transparency issue particular to DIBR is that each pixel really has two depth values even though it is being modeled in DIBR with only a single depth value. If one imagines a translucent sticker on the surface of the window in a position that overlays a portion of the tree, a straight DIBR implementation would make it appear as if the sticker were plastered over the surface of the tree, rather than at the depth of the window. This flows from the fact that the DIBR data structure includes only one depth value for each pixel, which results in pixel colors being transported to the wrong depths (for depth-blended content such as transparent elements).

Figure 4:
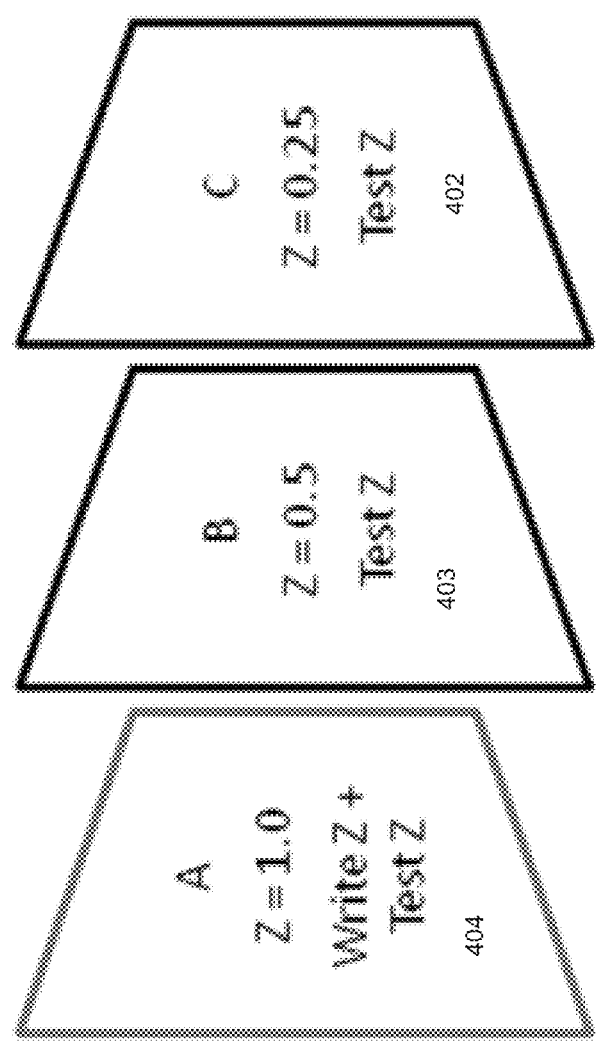
FIG. 4 further illustrates the problem of transparency when using DIBR to generate stereoscopic frames.

FIG. 4 further illustrates the problem of transparency when using DIBR to generate stereoscopic frames. FIG. 4 illustrates the rendering of transparent objects, wherein layers A 404, B 403 and C 402 all comprise pixels meant to be overlaid on top of each other in an image. For example, layers B 403 and C 402 can comprise pixels of two sides of a transparent bottle while layer A 404 can comprise pixels of a wall behind them. Because layers B and C are transparent, and they do not write into the depth buffer.

The pixels covered by all three layers comprise a color that is a result of blending of the A, B, and C layers. However, a blended pixel being written for all three layers will not have depth information for layers B and C (e.g. $z=0.5$ and $z=0.25$). When DIBR is applied (color pixels are moved horizontally), a blended pixel will be moved as if it were at the depth of layer A (e.g. $z=1.0$). The depth of layers B and C are not taken into account, as they do not write into depth buffer. In a real video game application, for example, this would result in the bottle being "splattered" (or painted) on the wall behind it. In other words, the bottle would appear as being directly overlaid or "splattered" over layer A (or at the same depth as layer A) instead of appearing as a discrete bottle at a fixed distance ($z=0.5$ and $z=0.25$) away from the wall at layer A.

Effects like transparency are difficult to solve with DIBR since there is no depth information for blended pixels at the stage in the rendering pipeline DIBR is applied, as illustrated in FIGS. 3 and 4. This, therefore, results in the blending operation being transported at an incorrect depth, as mentioned previously. A similar artifact results when attempting to blend in HUD elements on top of a three dimensional scene as a post process using DIBR. Because the pixels of the HUD element are typically rendered last and would not have the correct depth information (because, for example, they were drawn without depth writing enabled similar to layers B and C in FIG. 4), they would appear as "splattered" or painted over the tree 305 (in FIG. 3). This is especially problematic because HUD elements typically contain information about the user's ammunition, lives, score, etc. and need to be clearly visible to a user at all times during the game. Ideally, therefore, the HUD element would be drawn at some fixed depth above the background elements, e.g., the tree 305 so that it is easily perceivable by the user.

FIGS. 5A and 5B provides an example illustrating the problem of occlusion when using the DIBR technique to generate stereoscopic frames. As mentioned above, an original scene (e.g., the scene illustrated in FIG. 5A) can be rendered from a single center viewpoint and then the left and right perspectives can be generated using DIBR. Alternatively, the scene can be rendered from the left eye's perspective and then DIBR can be used to generate the right eye perspective. Stated simply, using a single color image and a depth buffer, DIBR is a post-process that can create a stereoscopic image by generating both a left and a right viewpoint from the color image and depth buffer. DIBR can do this, in part, by shifting the image to generate both the left eye view image 505 and the right eye view image 506. An unintended consequence of this is that the HUD element 511 also shifts and in some cases can be occluded from view, e.g., in image 506 when the image is shifted to generate the right eye view, the HUD element is also shifted out of view.

Embodiments of the present invention minimize the effects of occlusion and transparency when using image rendering techniques such as DIBR. In one embodiment, to address the distortive effects of occlusion and transparency when performing DIBR, full stereoscopic 3D vision rendering techniques are used to generate the HUD elements in the scene, while regular DIBR is used to generate all the remaining elements in the scene. 3D vision rendering techniques duplicate draw calls to both the left and the right eyes and, therefore, the distortive effects of occlusion and transparency are avoided when creating the HUD elements for on-screen display. In other words, switching, for depth-blended content, e.g., a HUD element, from the DIBR method to a 3D vision method, causes the content to be stereoscopically rendered to that it has the correct appearance.

Figure 6:
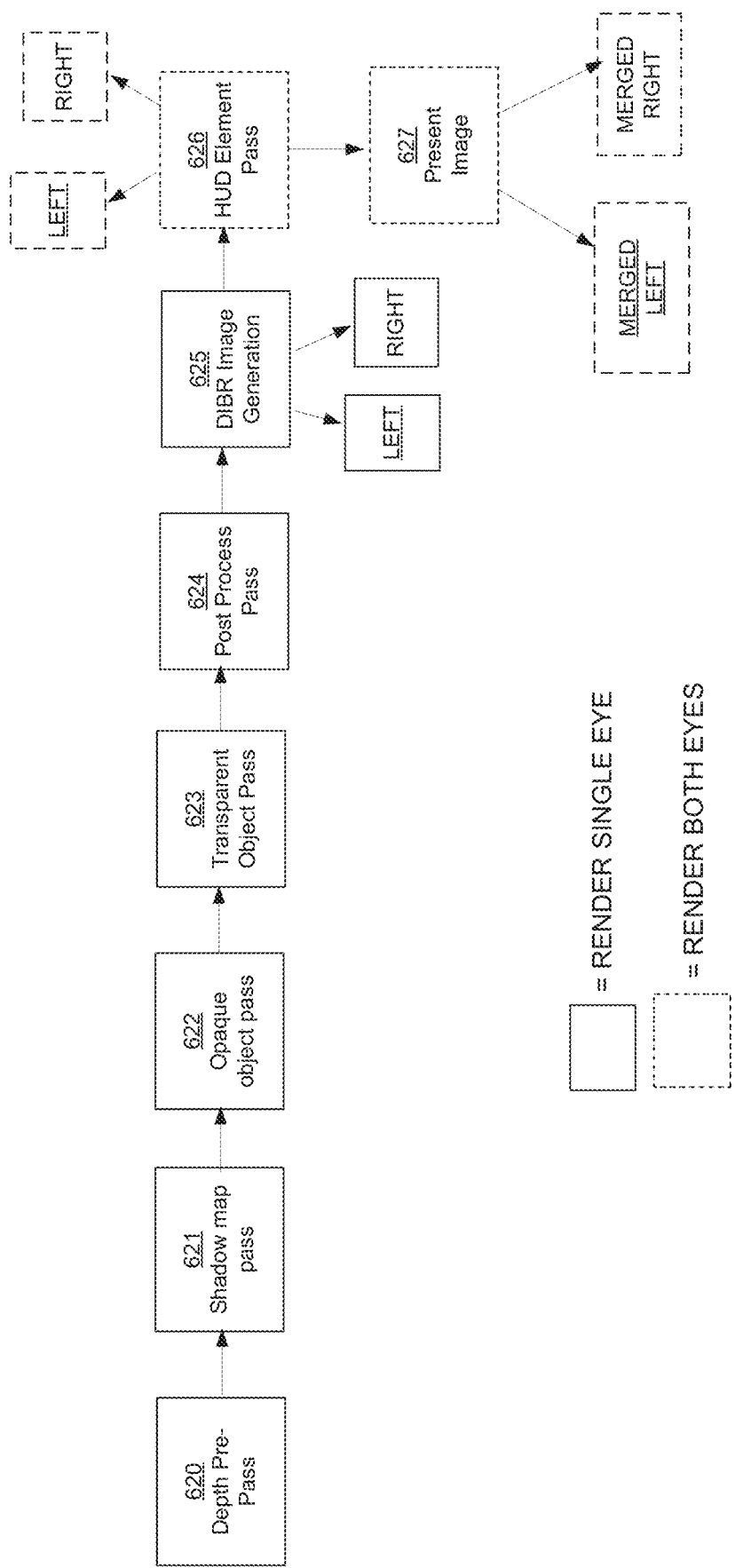
FIG. 6 illustrates the pipeline for the hybrid approach using both DIBR and 3D vision rendering techniques to generate stereoscopic frames in accordance with embodiments of the present invention.

FIG. 6 illustrates the rendering pipeline for the hybrid approach using both DIBR and 3D vision rendering techniques to generate stereoscopic frames in accordance with embodiments of the present invention. In order to render the HUD elements correctly (without the artifacts introduced by DIBR), the scene is first rendered from a single perspective as dictated by DIBR. Accordingly, the depth pre-pass 620, shadow map pass 621, opaque object pass 622, transparent object pass 623, and post process pass 624, operations are all rendered from a single perspective or, in other words, using just a left eye or right eye perspective (but not both). At the point in the rendering pipeline a HUD element is identified, the alternate viewpoints (Left and Right) are generated using DIBR at the DIBR image generation stage 625. At that point, the rendering switches to a full stereoscopic 3D vision implementation for the HUD rendering. As mentioned above, 3D vision duplicates draw calls so they apply to both the left and right eyes, and identifies HUD elements via a cutoff threshold of the transformed vertex in a vertex shader. It should be noted that both DIBR and 3D vision both generate left and right images, however, 3D vision renders the left and the right images separately, while DIBR will typically generate one by shifting the other. Accordingly, at HUD element pass stage 626, the HUD element is rendered using full stereoscopic 3D vision. The final image is then presented at Present Image stage 627, wherein the final image comprises both the left and right views merged together and is a hybrid product of both the DIBR and 3D vision techniques.

Using DIBR for the majority of the rendering and 3D vision only for the HUD elements allows the hybrid approach of the present invention to benefit from the performance, ease and compatibility advantages of DIBR, while paying a low performance penalty for the use of 3D vision for rendering the HUD elements. Using 3D vision to generate the HUD elements is relatively inexpensive despite the duplication it creates.

Figure 7B:
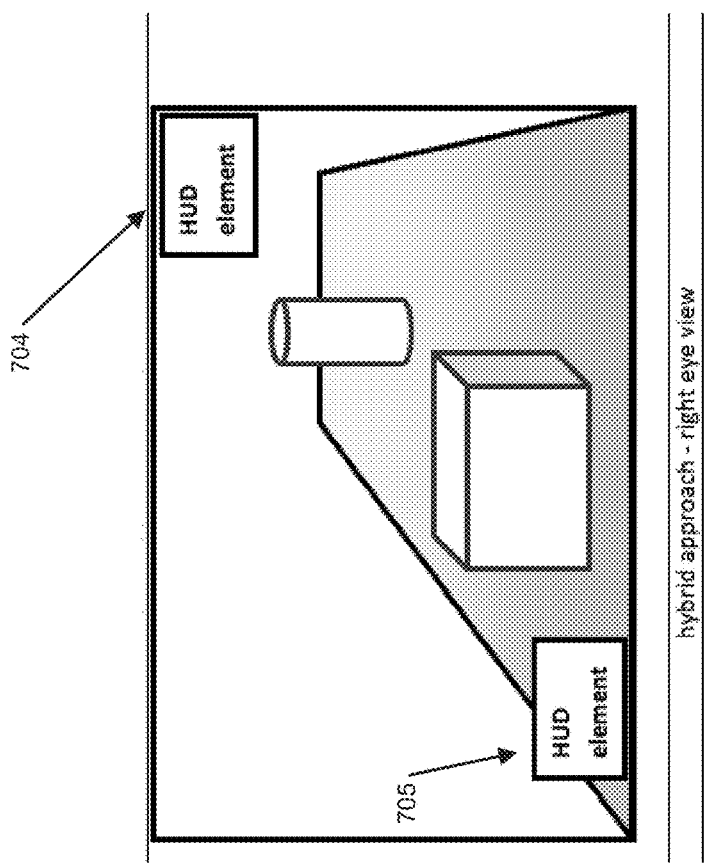
FIGS. 7A and 7B illustrate an exemplary image in which HUD elements are generated in accordance with embodiments of the present invention.
Figure 7A:
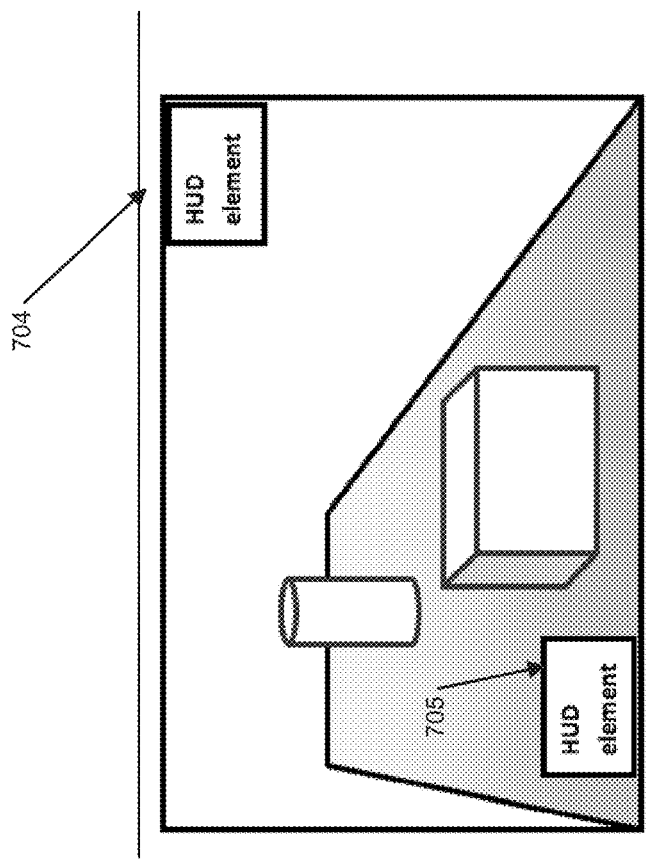

FIGS. 7A and 7B illustrate an exemplary image in which HUD elements are generated in accordance with embodiments of the present invention. As explained above, all the elements of the scene (except the HUD element) are first generated from a single view perspective, e.g., the left eye view in FIG. 7A. Before the HUD elements are drawn, DIBR is used to generate (e.g., by shifting) alternate viewpoints with the remaining elements in the image, e.g., the right eye view of FIG. 7B and the left eye view of FIG. 7A. Subsequently, 3D vision can be used to generate the HUD elements 704 and 705. Because 3D vision makes draw calls to both the left and right eyes, the HUD elements 704 and 705 can be correctly drawn at their appropriate locations in the image and do not need to be shifted. Further, 3D vision carries with it the appropriate depth information (e.g., separate depth information for each pixel from both the left and right calls) for the rendered pixels so the transparency problem occurring in DIBR images is avoided. Also, the 3D vision technique can paint the HUD elements onto the scene at some predetermined fixed distance, which will also avoid the problem of having the HUD element "splattered" over other image elements.

The HUD element problem with DIBR can be solved using more expensive, complex alternatives than the one suggested above. In one embodiment, for example, a variable sized list per pixel can be maintained which contains the depth value and blending information for each blend operation performed. During the reprojections stage of DIBR then, multiple reprojections and blending will need to be performed if blending occurred at that pixel. This solves the transparency problem generally but at a higher cost to both memory and performance.

Another alternative to the hybrid approach discussed above is to maintain a separate buffer specifically for HUD elements. During rendering, depth is checked in a vertex shader, and if it the element being rendered is identified as a HUD element, the geometry is redirected to a separate HUD buffer. This buffer is then composited back into the image at the end of the frame. Blending operations between the original buffer and the HUD buffer need to be cached and replicated during compositing. If multiple blending operations are applied to the HUD buffer, they need to be modified so the order of blend operations stays consistent.

The hybrid DIBR/3D-vision embodiments of the present invention avoid the extra steps and complexities related to separate buffer maintenance, multiple reprojections, or extra compositing steps while fixing the corruption for the HUD elements.

It should be noted that while the discussion above focuses on HUD elements, the hybrid DIBR/3D-vision techniques of the present invention can be applied to other elements in an image as well. For example, in one embodiments, all objects farther away in an image (objects that do not demonstrate a high parallax effect) would be generated using DIBR while all objects that are closer in the image would be generated using full stereoscopic 3D vision. Because objects farther way will typically not shift significantly between the left eye and right eye perspective, DIBR is sufficient to render those objects in the image. However, for objects in the foreground that may shift significantly and be occluded, it may be more feasible to render them using full 3D vision. In this embodiment, for example, an image may be bifurcated using an imaginary plane, wherein all objects behind the imaginary plane would be rendered using DIBR, while all objects in the foreground of the imaginary plane would be rendered using 3D vision techniques.

By way of further example, all transparent or semi-transparent objects in an image may be rendered using full 3D stereoscopic imaging techniques while all opaque objects may be rendered using DIBR. This too would circumvent the transparency related issues of DIBR.

Figure 8:
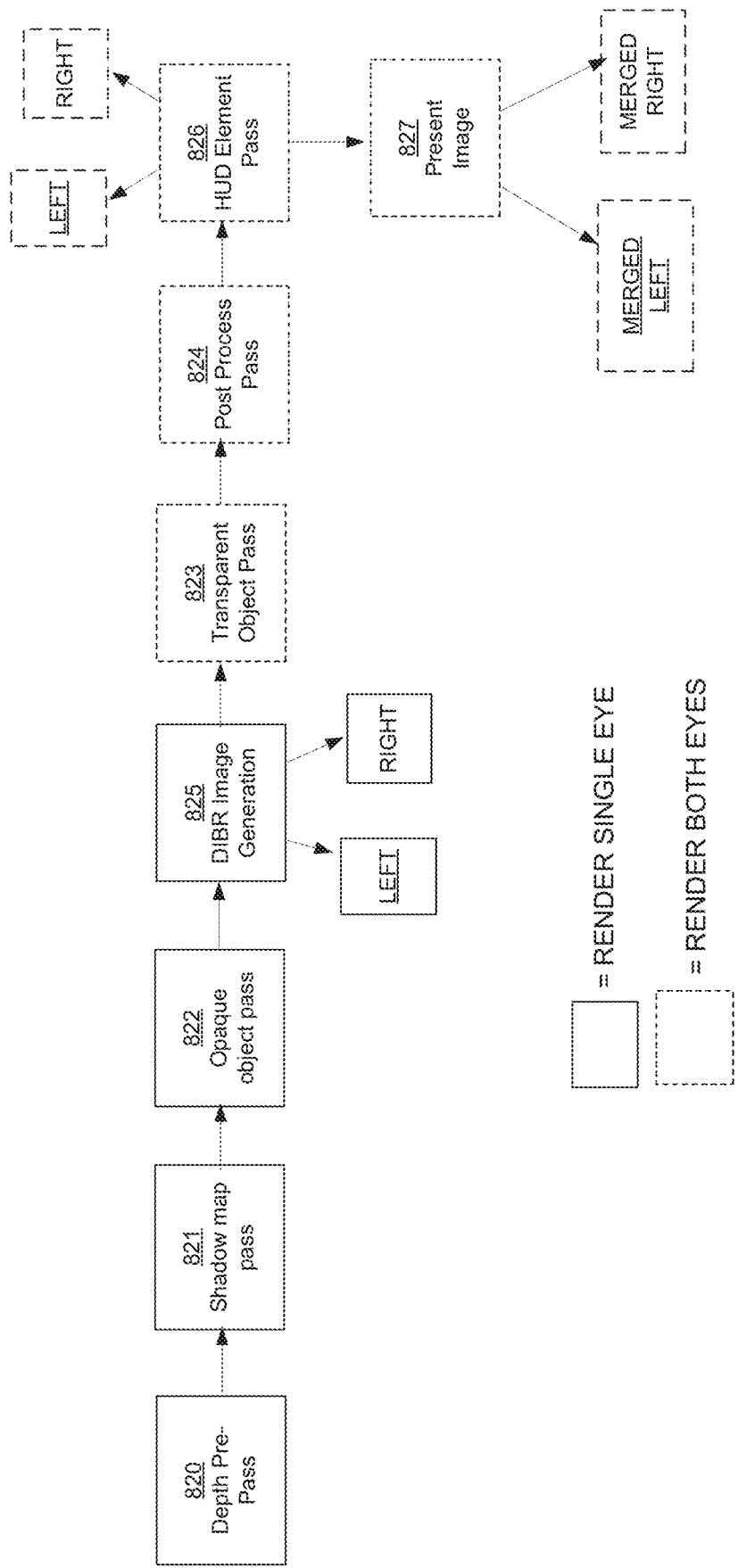
FIG. 8 illustrates the pipeline for the hybrid approach using DIBR and 3D vision rendering techniques to generate stereoscopic frames, wherein 3D vision is used for all transparent objects in an image, in accordance with embodiments of the present invention.

FIG. 8 illustrates the rendering pipeline for the hybrid approach using DIBR and 3D vision rendering techniques, wherein 3D vision is used for all transparent objects in an image, in accordance with embodiments of the present invention. In order to render the opaque elements, the scene is first rendered from a single perspective as dictated by DIBR. Accordingly, the depth pre-pass 820, shadow map pass 821, and opaque object pass 822 operations are all rendered from a single perspective or, in other words, using just a left eye or right eye perspective (but not both). At the point in the rendering pipeline a transparent element is identified, the alternate viewpoints are generated using DIBR at the DIBR image generation stage 825. At that point, the rendering switches to a full stereoscopic 3D vision implementation. As mentioned above, 3D vision duplicates draw calls so they apply to both the left and right eyes. Accordingly, transparent object pass 623 stage, and post process pass 624 stage, and HUD element pass stage 626, are all performed using full stereoscopic 3D vision. The final image is then presented at Present Image stage 627, wherein the final image comprises both the left and right views blended together and is a hybrid product of both the DIBR and 3D vision techniques.

Figure 9:
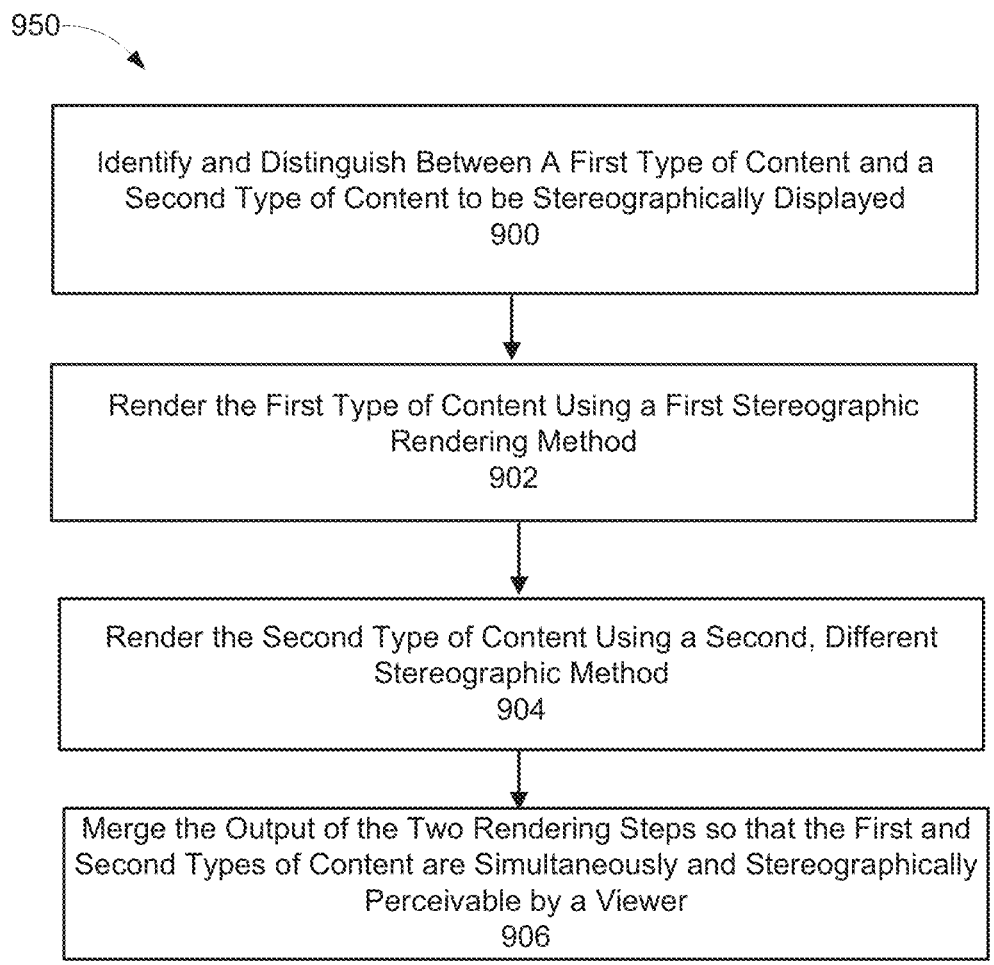
FIG. 9 shows a method for stereoscopically presenting visual content in accordance with an embodiment of the present invention.

Turning now to FIG. 9, the figure shows a method 950 for stereoscopically presenting visual content.

At 900, the method 950 includes identifying and distinguishing between a first type of content and a second type of content to be stereoscopically displayed. The first and second types of content may be distinguished based on whether to include depth-blended elements. The identifying and distinguishing may occur in real-time. It will be noted that elements involving transparency effects and/or HUD elements and/or foreground elements may be stereoscopically rendered differently than other elements.

At 902, the method includes rendering the first type of content using a first stereoscopic rendering method. The first stereoscopic rendering method may be depth-image based rendering.

At 904, the method includes rendering the second type of content using a second stereoscopic rendering method. The second stereoscopic rendering method may be a 3D vision method entailing replicated draw calls for left and right eyes.

At 906, the method includes merging the output of the rendering steps 104 and 106 so that the first and second types of content are simultaneously and stereoscopically perceivable by a viewer.

Figure 10:
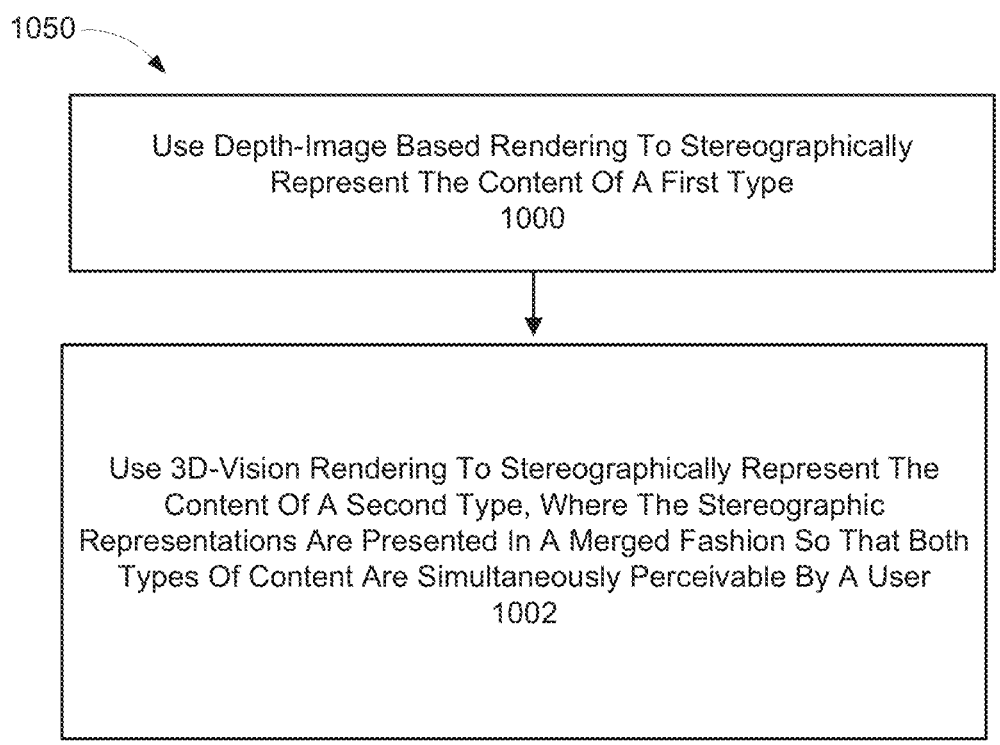
FIG. 10 shows a method for generating a stereoscopic representation including content of a first type and content of a second type in accordance with an embodiment of the present invention.

FIG. 10 shows method 1050 for generating a stereoscopic representation including content of a first type and content of a second type.

At 1000, the method includes using depth-image based rendering to stereoscopically represent the content of the first type.

At 1002, the method includes using 3D-vision rendering to stereoscopically represent the content of the second type, where the stereoscopic representations are presented in a merged fashion so that both types of content are simultaneously perceivable by a user.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein. This disclosure also includes all novel and non-obvious combinations and sub-combinations of the above systems and methods, and any and all equivalents thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for stereoscopically presenting visual content, comprising:
   identifying and distinguishing between a first type of content and a second type of content within a Three-Dimensional (3D) scene, wherein the first type of content comprises a first object in the 3D scene and the second type of content comprises a second object in the 3D scene;

rendering the 3D scene including the first type of content in a first left frame and a first right frame from a single perspective within the 3D scene using a depth-image based stereoscopic rendering method in which the 3D scene is rendered from the single perspective;

rendering the 3D scene including the second type of content in a second left frame and a second right frame from two different perspectives within the 3D scene using a 3D-vision stereoscopic rendering method in which the 3D scene rendered from the two different perspectives that correspond to replicated draw calls for left and right eyes;

merging the first left frame with the second left frame to produce a resultant left frame and the first right frame with the second right frame to produce a resultant right frame; and displaying the resultant left frame and the resultant right frame for stereoscopic perception by a viewer.

2. The method of claim 1, where the first and second types of content are distinguished based on whether to include depth-blended elements.

3. The method of claim 1, wherein the first type of content comprises opaque objects in the 3D scene and the second type of content comprises transparent or semi-transparent objects in the 3D scene.

4. The method of claim 1, wherein the identifying and distinguishing between a first type of content and a second type of content comprises:

identifying the first type of content based at least on the first type of content being behind an imaginary plane; and identifying the second type of content based at least on the second type of content being in a foreground of the imaginary plane.

5. The method of claim 1, where the identifying and distinguishing are performed in real time during stereoscopic rendering.

6. The method of claim 1, wherein the first type of content is rendered using the depth-image based stereoscopic rendering based at least on the first type of content being opaque.

7. The method of claim 1, wherein the second type of content is rendered using the 3D-vision stereoscopic rendering based at least on the second type of content being transparent or semi-transparent.

8. The method of claim 1, wherein the depth-image based stereoscopic rendering method renders the first type of content and the 3D-vision stereoscopic rendering method renders the second type of content in a common 3D rendering pipeline and the depth-image based stereoscopic rendering occurs prior to the 3D-vision stereoscopic rendering method in the common 3D rendering pipeline.

9. A method for generating a stereoscopic representation of a frame, the method comprising:

using depth-image based stereoscopic rendering of a Three-Dimensional (3D) scene to stereoscopically render a first element within the 3D scene, the first element being of a first type and being rendered to first left eye and right eye view images from a single perspective within the 3D scene;

using 3D-vision stereoscopic rendering of the 3D scene to stereoscopically render a second element within the 3D scene, the second element being of a second type and being rendered to second left eye and right eye view images from two perspectives within the 3D scene; and merging the first left eye and right eye view images with the second left eye and right eye view images to produce a left and a right frame, wherein the left and the right frames are presented in a merged fashion wherein the first element and the second element are stereoscopically perceivable by a user.

10. The method of claim 9, wherein the first element is rendered using the depth-image based stereoscopic rendering based at least on the first element being behind an imaginary plane and the second element is rendered using the 3D-vision stereoscopic rendering based at least on the second element being in a foreground of the imaginary plane.

11. The method of claim 9, wherein the first element is rendered using the depth-image based stereoscopic rendering based at least on the first element being opaque and the second element is rendered using the 3D-vision stereoscopic rendering based at least on the second element being transparent or semi-transparent.

12. The method of claim 9, wherein the 3D-vision stereoscopic rendering generates first depth information of the second element for a pixel from a first perspective and second depth information of the second element for the pixel from a second perspective.

13. The method of claim 9, wherein the using depth-image based stereoscopic rendering further comprises:

performing a plurality of operations to stereoscopically represent the first element selected from the group consisting of: depth pre-pass, shadow map pass, opaque object pass, transparent object pass and post-process pass.

14. The method of claim 9, wherein the depth-image based stereoscopic rendering on the first element is performed on a majority of the frame and is a faster image processing compared to the 3D-vision stereoscopic rendering.

15. The method of claim 9, wherein the 3D scene is bifurcated using an imaginary plane, wherein all content behind the imaginary plane is rendered using the depth-image based stereoscopic rendering, and wherein all content in a foreground of the imaginary plane is rendered using the 3D-vision stereoscopic rendering.

16. A system for stereoscopically presenting visual content, the system comprising:

a memory storing information related to the visual content;

a processor coupled to the memory, the processor operable to implement a method of stereoscopically presenting visual content, the method comprising:

identifying and distinguishing between a first type of element within a Three-Dimensional (3D) scene and a second type of element within the 3D scene to be stereoscopically displayed;

rendering the 3D scene including the first type of element in a first left frame and a first right frame from a single perspective within the 3D scene using a depth-image based stereoscopic rendering method in which the 3D scene is rendered from the single perspective;

rendering the 3D scene including the second type of element in a second left frame and a second right frame from two different perspectives within the 3D scene using a 3D-vision stereoscopic rendering method in which the 3D scene is rendered from the two different perspectives that correspond to replicated draw calls for left and right eyes;

merging the first left frame with the second left frame and the first right frame with the second right frame to produce a resultant left frame and a resultant right frame; and displaying the resultant left frame and the resultant right frame for stereoscopic perception by a viewer.

17. The system of claim 16, where the first and second types of elements are distinguished based on whether to include depth-blended elements.

18. The system of claim 16, wherein the first type of element is rendered using the depth-image based stereoscopic rendering based at least on the first type of element being opaque and the second type of element is rendered using the 3D-vision stereoscopic rendering based at least on the second type of element being transparent or semi-transparent.

19. The system of claim 16, wherein the first type of element is rendered using the depth-image based stereoscopic rendering based at least on the first type of element being behind an imaginary plane and the second type of element is rendered using the 3D-vision stereoscopic rendering based at least on the second type of element being in a foreground of the imaginary plane.

20. The system of claim 16, where the identifying and distinguishing are performed in real time during stereoscopic rendering.

* * * * *